US009398146B2

(12) United States Patent
Kerpez et al.

(10) Patent No.: US 9,398,146 B2
(45) Date of Patent: Jul. 19, 2016

(54) SYSTEM FOR DIAGNOSING AND OPTIMIZING VECTORED DSL LINES

(71) Applicant: Adaptive Spectrum and Signal Alignment, Inc., Redwood City, CA (US)

(72) Inventors: Kenneth Kerpez, Long Valley, NJ (US); Mehdi Mohseni, Menlo Park, CA (US); Wonjong Rhee, Seoul (KR); Stefano Galli, New York, NY (US); Georgios Ginis, San Mateo, CA (US); Ardavan Maleki Tehrani, Stanford, CA (US); Marc Goldburg, Redwood City, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 14/740,123

(22) Filed: Jun. 15, 2015

(65) Prior Publication Data

US 2015/0288811 A1    Oct. 8, 2015

Related U.S. Application Data

(62) Division of application No. 14/385,679, filed as application No. PCT/US2012/029677 on Mar. 19, 2012, now Pat. No. 9,060,054.

(51) Int. Cl.
*H04B 1/38* (2015.01)
*H04B 3/46* (2015.01)
(Continued)

(52) U.S. Cl.
CPC . *H04M 3/34* (2013.01); *H04B 3/32* (2013.01); *H04B 3/487* (2015.01); *H04M 3/2209* (2013.01); *H04M 11/062* (2013.01); *Y02B 60/36* (2013.01)

(58) Field of Classification Search
CPC .......... H04B 3/32; H04B 3/464; H04B 17/00; H04B 17/0055; H04B 3/46; H04M 3/34; H04M 3/304; H04M 3/30; H04L 12/26; H04L 12/2874; H04L 2012/6478

USPC .......................................... 375/222–224, 227
See application file for complete search history.

(56) References Cited

U.S. PATENT DOCUMENTS

2006/0274893 A1 * 12/2006 Cioffi .................... H04B 3/487
379/399.01
2008/0260003 A1   10/2008 Baudais
(Continued)

FOREIGN PATENT DOCUMENTS

WO    2010019486    2/2010
WO    2012018289    2/2012

OTHER PUBLICATIONS

International Preliminary Report on Patentability for International Patent Application No. PCT/US2012/029677, dated Oct. 2, 2014, 7 pages.

(Continued)

*Primary Examiner* — Don N Vo
(74) *Attorney, Agent, or Firm* — Green, Howard & Mughal LLP

(57) ABSTRACT

In accordance with embodiments disclosed herein, there are provided methods, systems, mechanisms, techniques, and apparatuses for diagnosing and optimizing vectored DSL lines. For example, in one embodiment, such a system includes an interface to a first subset of a plurality of digital communication lines allocated to a vectored group and to a second subset of the plurality of digital communication lines which operate external to the vectored group; a Dynamic Spectral Management server (DSM server) to analyze the vectored group by performing the following operations for each of the plurality of digital communication lines in the vectored group: measuring a mitigated noise level for the digital communication line with crosstalk cancellation active, measuring a non-mitigated noise level for the digital communication line with crosstalk cancellation inactive, and comparing the mitigated noise level measured on the digital communication line with the non-mitigated noise level measured on the digital communication line. In such an embodiment, the DSM server of the system further issues optimization instructions based on the analysis. For example, by issuing optimization instructions for the vectored group, for lines external to the vectored group, or for both.

25 Claims, 13 Drawing Sheets

(51) Int. Cl.
*H04M 3/34* (2006.01)
*H04B 3/32* (2006.01)
*H04M 11/06* (2006.01)
*H04B 3/487* (2015.01)
*H04M 3/22* (2006.01)

(56) References Cited

U.S. PATENT DOCUMENTS

| | | | |
|---|---|---|---|
| 2010/0135482 A1 | 6/2010 | Jagannathan et al. | |
| 2010/0232486 A1* | 9/2010 | Starr | H04B 3/32 375/222 |
| 2011/0110409 A1* | 5/2011 | Sands | H04B 3/464 375/222 |
| 2011/0150057 A1 | 6/2011 | Anschutz et al. | |
| 2011/0268258 A1 | 11/2011 | Alloin et al. | |
| 2012/0027060 A1* | 2/2012 | Singh | H04B 3/32 375/222 |
| 2012/0140901 A1* | 6/2012 | Tennyson | H04M 3/306 379/27.01 |
| 2015/0023494 A1* | 1/2015 | Fisher | H04B 3/32 379/406.01 |

OTHER PUBLICATIONS

Dynamic Spectrum Management for Mixtures of Vectored and Non-Vectored DSL Systems, by Mohseni et al, 6 pages.
System for Diagnosing and Optimizing Vectored DSL Lines, by Kerpez et al. dated May 26, 2011, 9 pages.
CuPON: The Copper Alternative to PON 100 Gb/s DSL Networks, by Cloth et al. from IEEE Communications Magazine, Jun. 2007, 8 pages.
International Search Report and Written Opinion for International Patent Application No. PCT/US2011/065279, dated Aug. 2, 2012, 12 pages.
International Preliminary Report on Patentability for International Patent Application No. PCT/US2011/065279, dated Jun. 26, 2014, 8 pages.
Spectral Compatibility of In-Home and Access Technologies, by Maes et al., 2011 IEEE International Symposium On, dated Apr. 3, 2011, 5 pages.
PLC and VDSL2 Coexistence, by Moulin et al. 2010 IEEE, dated Mar. 28, 2010, 6 pages.
Notice of Allowance mailed Feb. 12, 2015 for U.S. Appl. No. 14/385,679.
First Examination Report mailed Jan. 23, 2015, for Australian Patent Application No. 2011383259.
Non-Final Office Action mailed Mar. 31, 2015 for U.S. Appl. No. 14/365,604.
First Examination Report mailed Mar. 20, 2015 for Australian Patent Application No. 2012374062.
First Office Action mailed Apr. 21, 2015 for Chinese Patent Application No. 2011800763642.
Notice of Allowance mailed Nov. 4, 2015 for U.S. Appl. No. 14/365,604.
Office Action mailed Jun. 30, 2015 for Japanese Patent Application No. JP 2014-547157.
Examination Report mailed Mar. 20, 2015 for Australian Patent Application No. 2012374062.
Office Action mailed May 26, 2015 for Chinese Patent Application No. 201280072524.0.
Office Action mailed Oct. 6, 2015 for Japanese Patent Application No. 2015-501633 [no translation available].

* cited by examiner

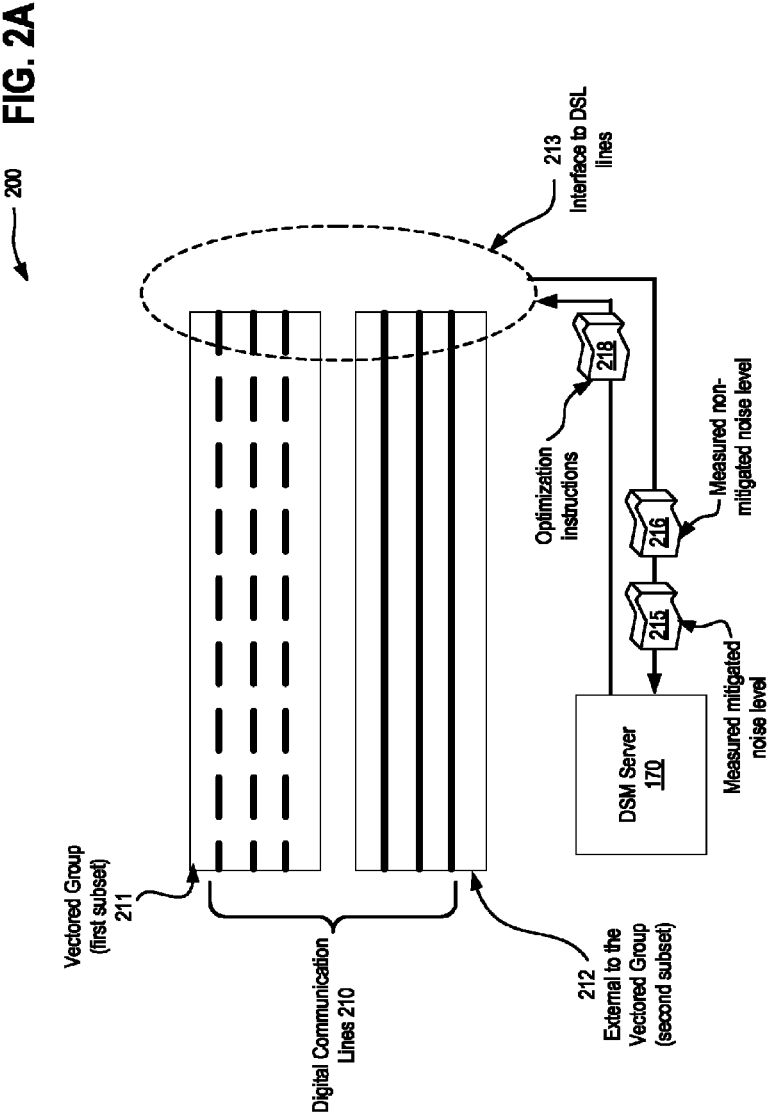

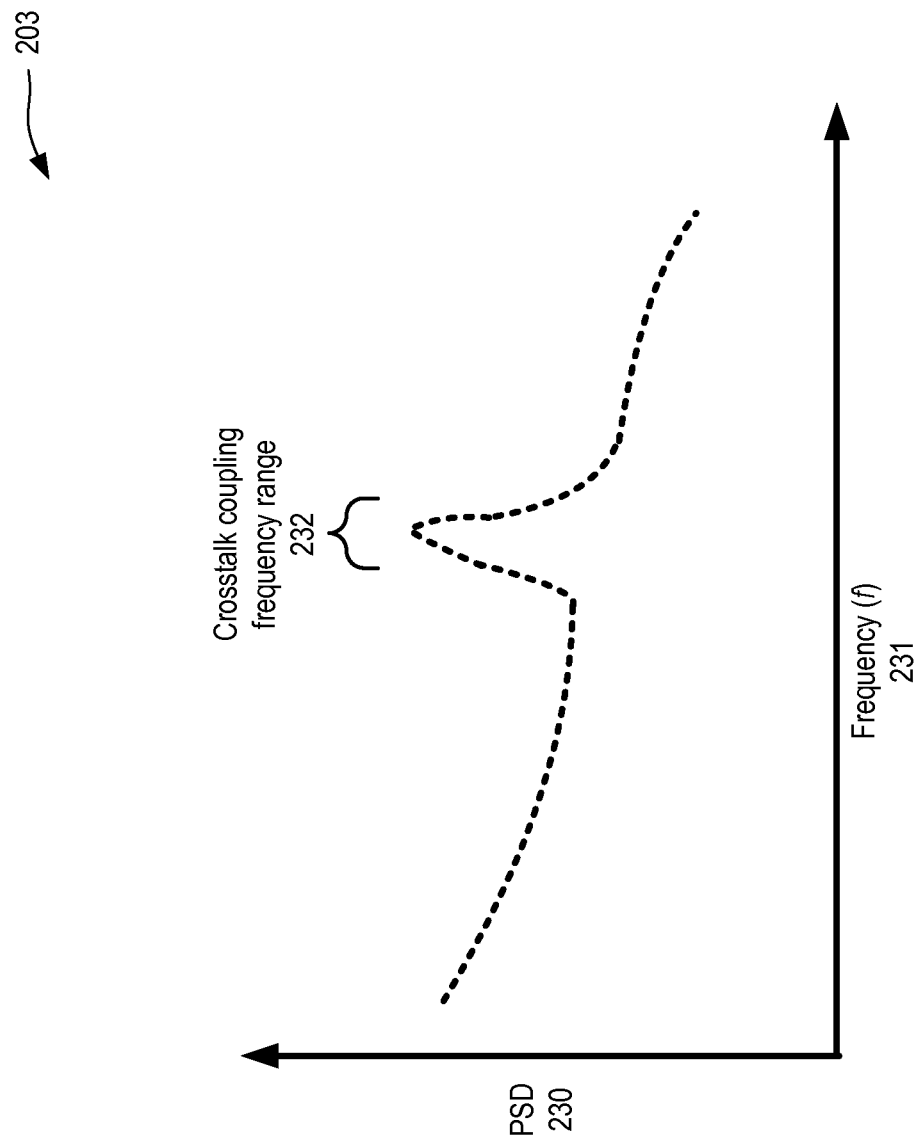

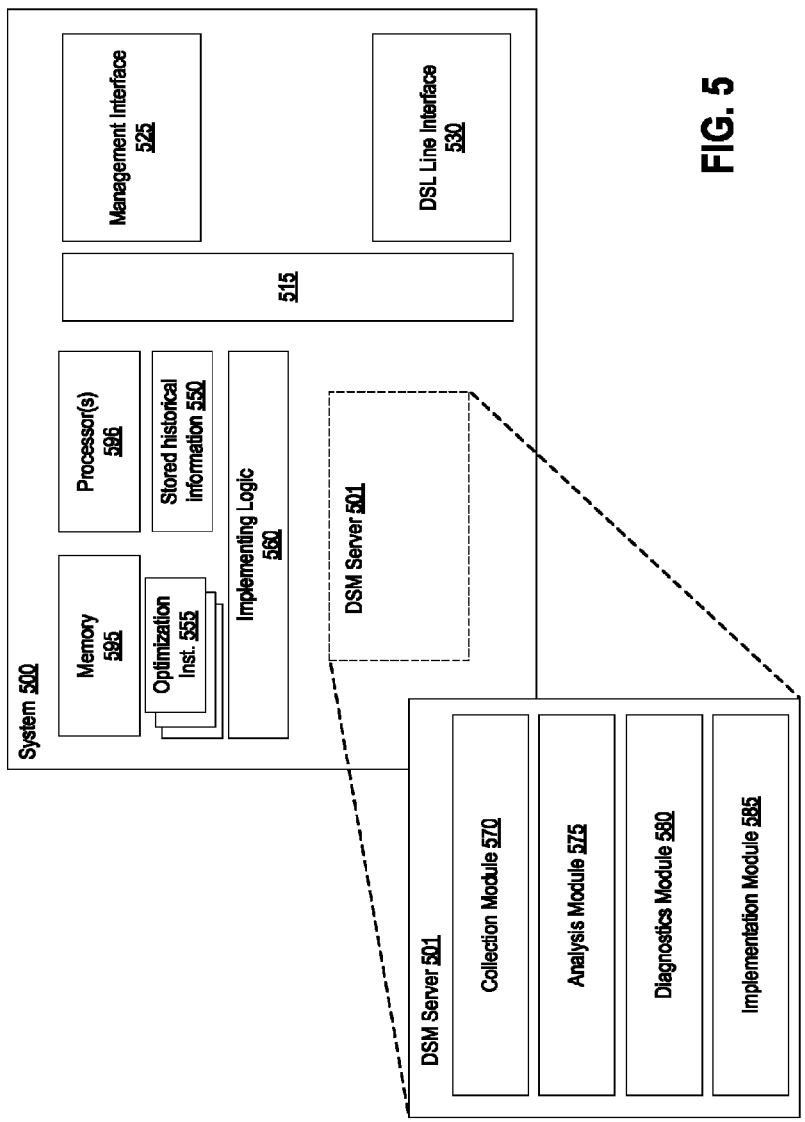

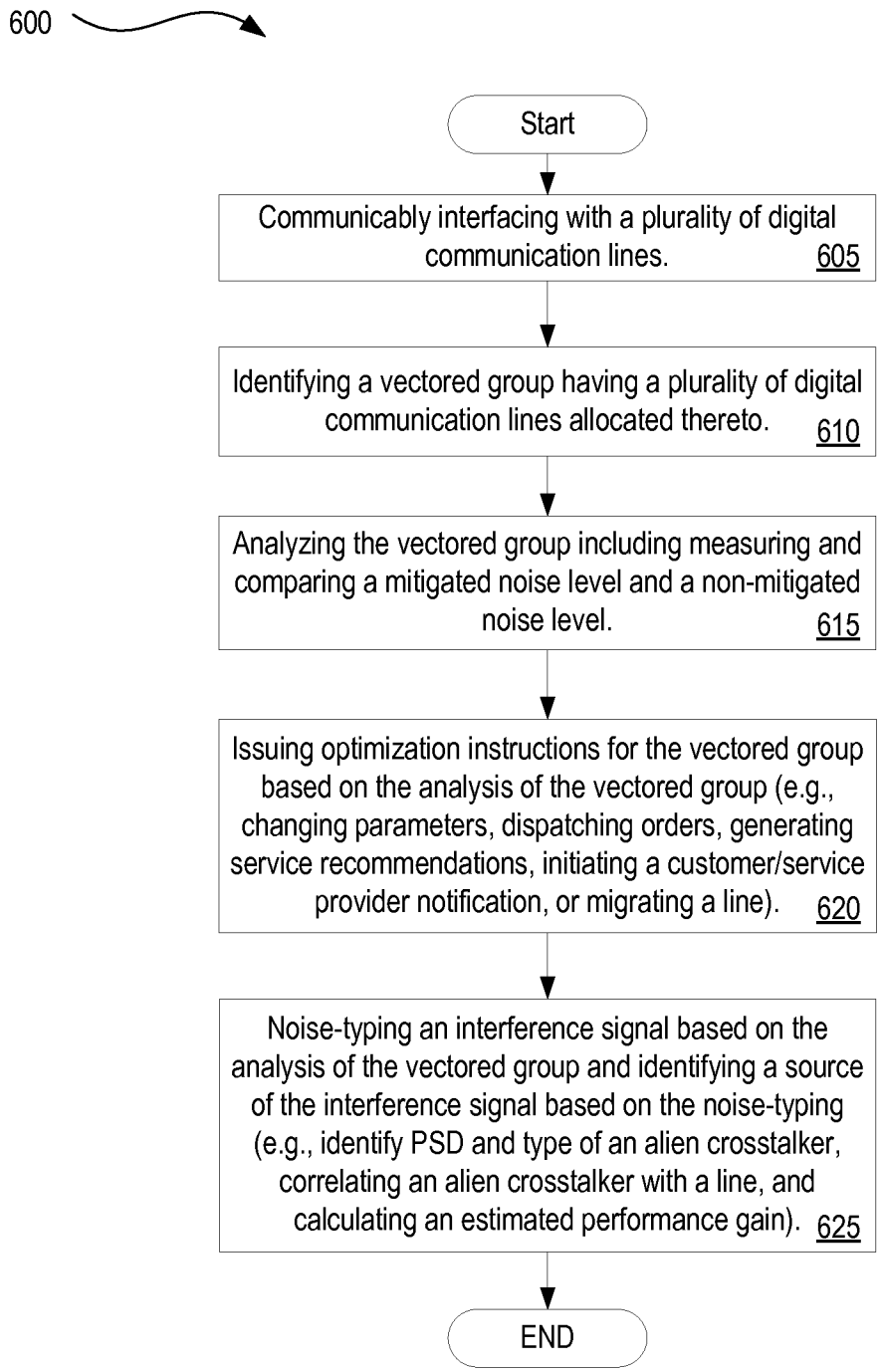

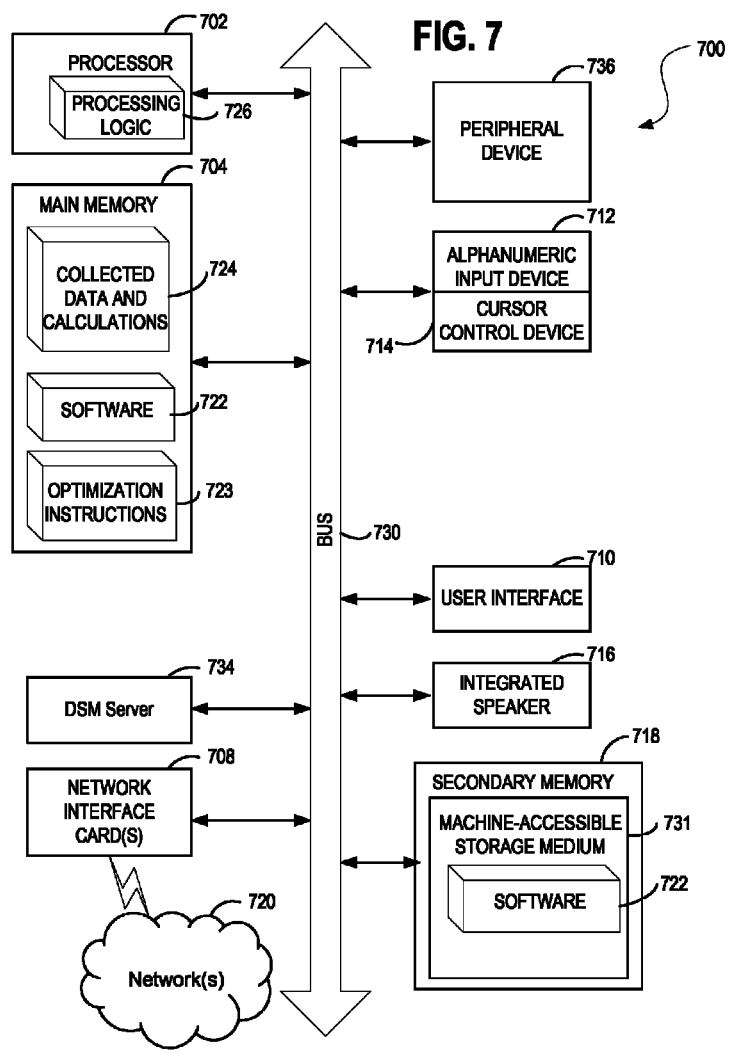

SYSTEM FOR DIAGNOSING AND OPTIMIZING VECTORED DSL LINES

CLAIM OF PRIORITY

This divisional application is related to, and claims priority to, the U.S. National Phase application Ser. No. 14/385,679, filed on Sep. 6, 2014, entitled "SYSTEM FOR DIAGNOSING AND OPTIMIZING VECTORED DSL LINES"; and International Application No. PCT/US2012/029677, filed Mar. 19, 2012, entitled "SYSTEM FOR DIAGNOSING AND OPTIMIZING VECTORED DSL LINES", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for diagnosing and optimizing vectored DSL lines.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Vectored DSL technology aids in mitigating crosstalk effects that degrade performance in deployments of DSL lines operating at high speeds. Crosstalk may be a significant noise source in multi-pair copper cables used for DSL transmission. High speed DSL deployments are particularly vulnerable to crosstalk for both the downstream and the upstream transmission directions; data rates being limited typically by Far-End-Crosstalk (FEXT). When multiple DSL line pairs share the same cable they induce crosstalk into each other which negatively affects performance.

Vectored DSL uses advanced signal processing techniques to mitigate crosstalk and thus, improve performance. However, where mitigation techniques may be further improved, additional performance gains are possible. Moreover, not all lines within a particular cable participate in a vectoring scheme, and thus, such lines are not subject to crosstalk mitigation techniques using conventional vectoring capabilities, yet, non-vectored lines may nevertheless negatively affect the operation of vectored lines due to, for example, crosstalk coupling onto the vectored lines.

The present state of the art may therefore benefit from systems and methods for diagnosing and optimizing vectored DSL lines as described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 2A, 2B, 2C, and 2D illustrate alternative exemplary architectures in which embodiments may operate;

FIG. 5 illustrates a diagrammatic representations of a system in accordance with which embodiments may operate, be installed, integrated, or configured;

FIG. 6 is a flow diagram illustrating a method for diagnosing and optimizing vectored DSL lines in accordance with described embodiments; and FIG. 7 illustrates a diagrammatic representation of a machine in the exemplary form of a computer system, in accordance with one embodiment.

DETAILED DESCRIPTION

Figure 1:
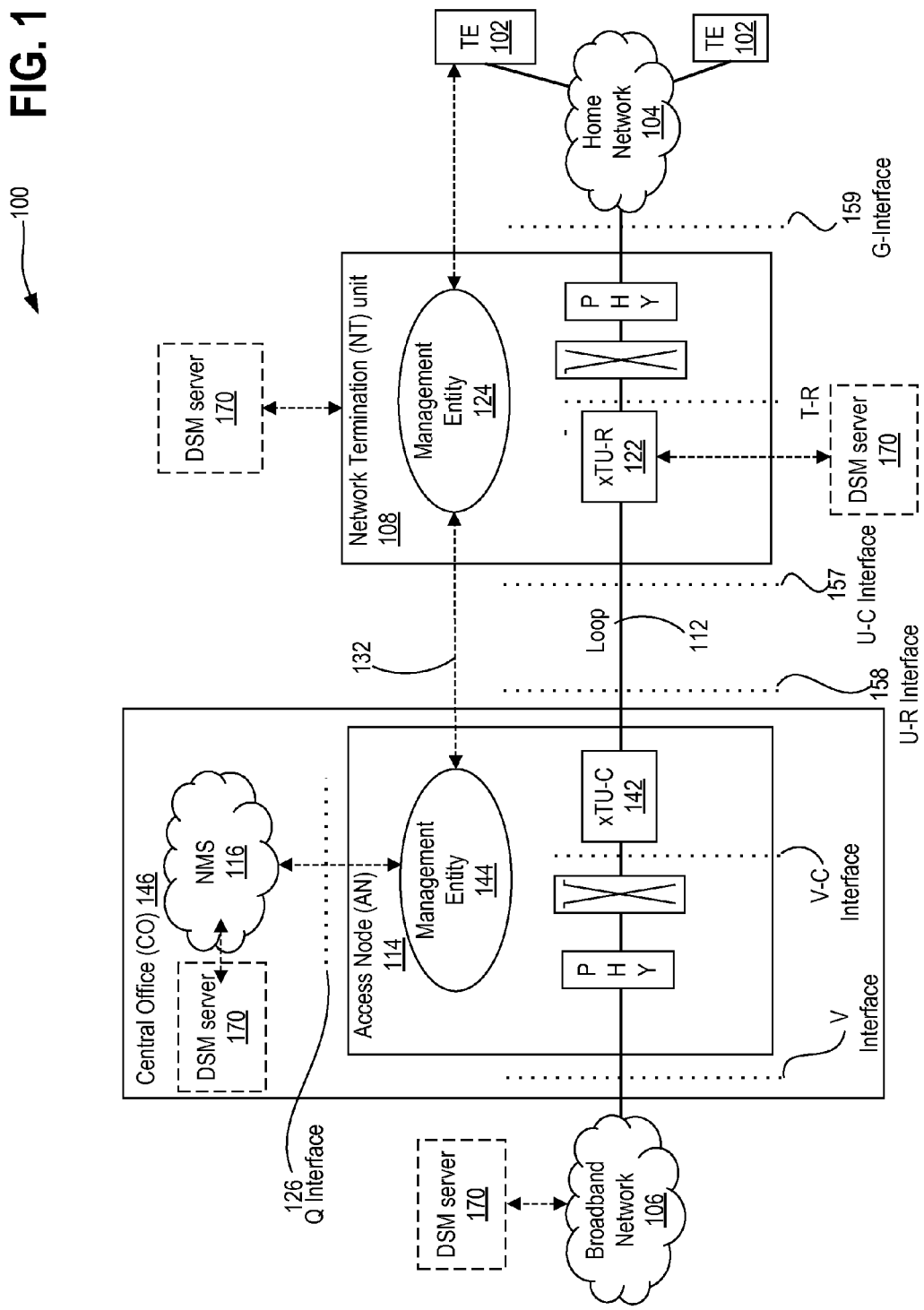
FIG. 1 illustrates an exemplary architecture in which embodiments may operate.

Described herein are systems and methods for diagnosing and optimizing vectored DSL lines.

For example, in one embodiment, such a system includes an interface to a first subset of a plurality of digital communication lines allocated to a vectored group and interfaced to a second subset of the plurality of digital communication lines which operate external to the vectored group. In such an embodiment, a Dynamic Spectral Management server (DSM server) analyzes the vectored group by performing the following operations for each of the plurality of digital communication lines in the vectored group: measuring a mitigated noise level for the digital communication line with crosstalk cancellation active, measuring a non-mitigated noise level for the digital communication line with crosstalk cancellation inactive, and comparing the mitigated noise level measured on the digital communication line with the non-mitigated noise level measured on the digital communication line. In such an embodiment, the DSM server further issues optimization instructions. For example, the DSM server may issue instructions for the digital communication lines in the vectored group, or issue instructions for the digital communication lines external to the vectored group, or issue instructions for both, based on the analysis of the vectored group.

Different vectoring implementations may cancel crosstalk with different levels of suppression, and the systems and mechanisms disclosed herein are able to track how well vectoring is working. For example, such a system may calculate what the current vectoring performance should be and compare this to actual reported signal to noise ratio (SNR), margin, and bit rate. If actual performance is below calculated performance, then the root cause of the performance degradation may be determined by examining data reported by vectored lines such as reported channel responses (Hlog), signal to noise ratio (SNR), quiet line noise PSDs (QLN), and pair-to-pair crosstalk couplings (Xlog). Reported data from vectored lines may indicate anomalies and potential root causes, such as determining if crosstalk cancellation is limiting or inhibiting performance or whether there are problems with excess crosstalk from lines outside the vectored group into the vectored group. Individual vectored or non-vectored lines generating excessive crosstalk and affected frequency bands may also be identified.

To isolate root causes, it helps to separate crosstalk from background noise, and to further separate the cancelled and un-cancelled components of the crosstalk. To estimate the residual Far-End Crosstalk (FEXT), and determine the effectiveness of vectoring for a given DSL line, quantities are presented on a linear scale rather than dB, as follows:

SNR(f) is: signal to noise ratio at frequency f as defined in G.993.2.

H(f) is: complex channel characteristic function at frequency f as defined in G.993.2.

QLN(f) is: quiet line noise PSD (Power Spectral Density) at frequency f as defined in G.993.2.

$S_j(f)$ is defined as: transmit PSD on line j. $S_j(f)$ may be estimated from MREFPSD and fine gains, $g_i$ as defined in G.993.2.

$Xlin_{ij}(f)$ is: the upstream or downstream FEXT coupling coefficient from pair j into pair i, as defined in G.993.5, where pair i is the pair being analyzed, in which the "pair" is a twisted pair line which is equivalent to a DSL line, a DSL loop, or a digital communication line as is described herein.

$XT_i(f)$ is defined as: sum of the crosstalk from other vectored lines into vectored DSL line i. This is the crosstalk that would have coupled into the line if there were no vectoring applied, for example, when mitigation techniques are inactive or switched off. $XT_i(f)$ is unknown but may be estimated as the sum of $S_i(f)$ times $|Xlin_{ij}(f)|^2$ from all surrounding vectored lines, except for the given line as follows:

$$XT(f) = \sum_{j \neq i} Sj(f) XLOG_{ij}(f)$$

By definition $XT_i(f)$ is equal to the sum of $RXT_i(f)$ and $CXT_i(f)$, where $RXT_i(f)$ is defined as the residual crosstalk, from the vectored lines, that remains after vectoring and where $CXT_i(f)$ is defined as the crosstalk that was removed by vectoring cancellation or precoding. Both $RXT_i(f)$ and $CXT_i(f)$ are unknown. For simplicity, the index of the vectored line, i, will be omitted from now on.

N(f) is defined as: background noise plus crosstalk from lines that are not in the same vectored group and lines in the vectored group that are not cancelled. N(f) is unknown.

ALN(f) is defined as: active line noise PSD of a line. ALN(f) includes noise input to the receiver plus noise due to receiver imperfections while the line is active including front-end noise and quantization. ALN(f) is unknown.

A(f) is defined as: the noise PSD component due only to receiver imperfections while the line is active including front-end noise and quantization. A(f) is unknown.

When vectoring is not enabled: $ALN_{NC}(f)=N(f)+A(f)+XT(f)$ (in which NC denotes ALN and is calculated while crosstalk is not canceled).

When vectoring is enabled: $ALN_C(f)=N(f)+A(f)+RXT(f)$ (in which C denotes ALN and is calculated while crosstalk is canceled).

QLN(f) is estimated for a given line during start-up or during loop diagnostics mode. Vectoring is not implemented into this line while QLN(f) is estimated.

QLN(f) may thus be written as: $QLN(f)=N(f)+XT(f)$.

N(f) is then estimated since $N(f)=QLN(f)-XT(f)$.

Estimation of the unknown spectra, $ALN_{NC}(f)$, $ALN_C(f)$, RXT(f), and CXT(f) is performed by reading SNR(f) when vectoring is enabled and disabled into a given line.

First, disable vectoring into the given line. Then, SNR(f) is measured, with $SNR(f)=S_i(f)|H(f)|^2/ALN_{NC}(f)$.

$ALN_{NC}(f)$ is then estimated since $ALN_{NC}(f)$ is equal to $Si(f)|H(f)|^2/SNR(f)$.

Second, re-enable vectoring into the given line.

SNR(f) is then measured when vector crosstalk cancellation is implemented, with $SNR(f)=S_i(f)|H(f)|^2/ALN_C(f)$.

RXT(f) and CXT(f) are then estimated since $CXT(f)=XT(f)-RXT(f)=ALN_{NC}(f)-ALN_C(f)$ and $RXT(f)=XT(f)-CXT(f)$.

As an alternative, RXT(f) may be estimated with the following two operations: QLN'(f) may also be estimated in the upstream direction while vectoring is enabled. And thus, $QLN'(f)=N(f)+RXT(f)$, and then RXT(f) may be estimated since $RXT(f)=QLN'(f)-N(f)$, in the upstream direction only.

Next, $ALN_C(f)=N(f)+A(f)+RXT(f)$, where A(f) is defined as the noise component due to receiver imperfections while the line is active including front-end noise and quantization.

A(f) may thus be estimated since $A(f)=ALN_C(f)-N(f)-RXT(f)$.

Thus, the following noise components have all been estimated: receiver noise A(f), the residual uncancelled crosstalk from the lines in the vectored group, RXT(f), the cancelled crosstalk from the lines in the vectored group, CXT(f), and the background noise plus crosstalk from lines that are not in the same vector group, N(f). These quantities may be used to identify the effectiveness of vectoring, and verify proper operation of the vectoring receiver.

A relatively high A(f) indicates a poor receiver front end. A relatively high ratio of RXT(f)/CXT(f) indicates poor vectoring performance. A relatively high ratio of N(f)/XT(f) indicates that vectoring cannot or will not have much effect and that perhaps the line should not be vectored. For example, where vectoring will not have much effect, the vectoring resources may be more beneficial if applied elsewhere. Furthermore, N(f) can be analyzed to identify the FEXT component from the lines in the non-vectored group. For example, this can be done by exploiting the Radio Frequency Interference (RFI) notching mechanism in DSL. If RFI notching is enabled, DSL transmit PSD should be reduced in predefined frequency bands dedicated to, for example, amateur radio broadcasts (e.g., ham radio) to avoid excessive interference to such frequency bands. As a result, N(f) will have negligible crosstalk component in the predefined frequency bands, which are spread over all the DSL frequency bands. The FEXT component can be identified by comparing N(f) in these bands with other bands. This FEXT component can later be employed for applying proper transmit PSD on the non-vectored lines and provide the required protection to guarantee the performance of the vectored lines.

Noise at the customer end of the line is often very different from the noise at the network end of the line. Thus, the analyses presented here may be applied separately at the upstream and downstream receivers. More sophisticated estimators could be used in the same framework, such as using maximum entropy to estimate the spectra.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device, a traffic aggregation unit, and/or a traffic de-aggregator to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN).

In FIG. 1, users terminal equipment 102 (e.g., a Customer Premises Equipment (CPE) device or a remote terminal device, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote), 122 (for example, a transceiver defined by one of the ADSL or VDSL standards) or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; or via a TR-69 based protocol. "TR-69" or "Technical Report 069" is in reference to a DSL Forum technical specification entitled CPE WAN Management Protocol (CWMP) which defines an application layer protocol for remote management of end-user devices. XML or "eXtended Markup Language" compliant programming and interface tools may also be used.

Each xTU-R 122 in a system may be coupled with an xTU-C (xTU Central) in a Central Office (CO) or other central location. The xTU-C 142 is located at an Access Node (AN) 114 in Central Office 146. A Management Entity 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a loop 112, which in the case of ADSL may be a twisted pair line, such as a telephone line, which may carry other communication services besides DSL based communications. Either Management Entity 124 or Management Entity 144 may implement and incorporate a Dynamic Spectrum Management (DSM) server 170 as described herein. The DSM server 170 may be operated by a service provider or may be operated by a third party, separate from the entity which provides DSL services to end-users. Thus, in accordance with one embodiment, the DSM server 170 is operated and managed by an entity which is separate and distinct from a telecommunications operator responsible for a plurality of digital communication lines. Management Entity 124 or Management Entity 144 may further store collected WAN information and collected LAN information within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in ME 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124.

At the U-interface (also referred to as loop 112), there are two management interfaces, one at xTU-C 142 (the U-C interface 157) and one at xTU-R 122 (the U-R interface 158). The U-C interface 157 provides xTU-C near-end parameters for xTU-R 122 to retrieve over the U-interface/loop 112. Similarly, the U-R interface 158 provides xTU-R near-end parameters for xTU-C 142 to retrieve over the U-interface/loop 112. The parameters that apply may be dependent upon the transceiver standard being used (for example, G.992.1 or G.992.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is Dynamic Spectral Management server (DSM server) 170 operating at various optional locations in accordance with several alternative embodiments. For example, DSM server 170 may be located within central office 146 and interfaced broadband network 106 (e.g., a WAN) via Network Management System (NMS) 116. In yet another embodiment, DSM server 170 is connected with a NT unit 108 or with xTU-R 122 over the G-interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission functionality, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2A illustrates an alternative exemplary architecture 200 in which embodiments may operate. FIG. 2A depicts an interface 213 to a first subset of a plurality of digital communication lines 210 allocated to a vectored group 211 and to a second subset of the plurality of digital communication lines 210 which operate external 212 to the vectored group 211. A Dynamic Spectral Management server (DSM server) 170 is further depicted. In such an embodiment the DSM server is to analyze the vectored group 211 by performing the following operations for each of the plurality of digital communication lines 210 in the vectored group 211: (a) measure a mitigated noise level 215 for the digital communication line with crosstalk cancellation active (e.g., measuring the parameter for each line within the plurality of digital communication lines 210 allocated to the vectored group 211); (b) measure a non-mitigated noise level 216 for the digital communication line with crosstalk cancellation inactive, and (c) compare the mitigated noise level 215 measured on the digital communication line with the non-mitigated noise level 216 measured on the digital communication line. For example, for each line the mitigated noise level 215 and the non-mitigated noise level 216 is compared. In such an embodiment, the DSM server 170 is further to issue optimization instructions 218 for the vectored group 211 based on the analysis of the vectored group 211. In alternative embodiments, the DSM server 170 issues optimization instructions 218 for the non-vectored group or one or more lines external to the vectored group (e.g., one or more of the digital communication lines 210 external to the vectored group 212 in the second subset of lines) based on the analysis of the vectored group 211. In another alternative embodiment, the DSM server 170 issues optimization instructions 218 for one or more of the lines in each of the vectored group 211 and the non-vectored group based on the analysis of the vectored group 211. Thus, subsequent to the analysis of the vectored group 211, any combination of lines, vectored or otherwise, may be caused to alter their operational behavior through subsequent instruction from the DSM server 170.

The mitigated noise level 215 may be represented as $ALN_C(f)$, for example, when vectoring is enabled. The non-mitigated noise level 216 may be represented as $ALN_{NC}(f)$, for example, when vectoring is not enabled.

In one embodiment, the plurality of digital communication lines 210 are implemented as a plurality of Digital Subscriber Lines (DSL lines). In one embodiment, the first subset 211 of the plurality of digital communication lines 210 allocated to the vectored group 211 are vectored DSL lines.

Figure 2B:
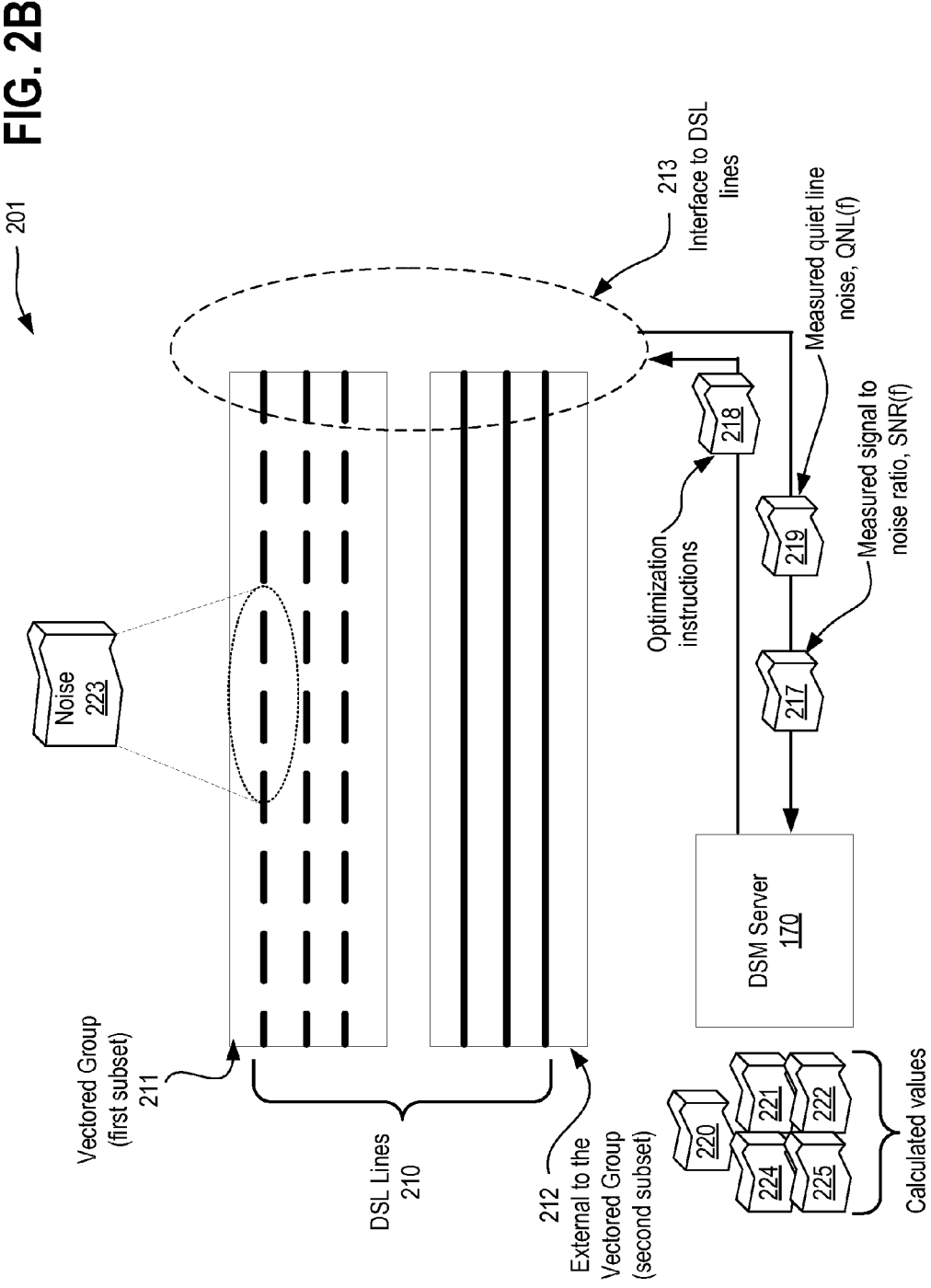

FIG. 2B illustrates an alternative exemplary architecture 201 in which embodiments may operate. In one embodiment, the DSM server 170 analyzes the vectored group 211 by calculating an estimated noise level 220 and an estimated crosstalk level 221 for each of the plurality of digital communication lines 210 in the vectored group 211. For example, N(f) representing the background noise plus crosstalk may be estimated and compared with $ALN_C(f)$ and $ALN_{NC}(f)$ representing mitigated noise levels and non-mitigated noise levels respectively.

In one embodiment, the DSM server 170 calculating the estimated noise level 220 for each of the plurality of digital communication lines 210 in the vectored group 211 by calculating the total Far End Crosstalk (FEXT) Power Spectral Density (PSD) 222 received by each of the plurality of digital communication lines 210 in the vectored group 211.

In one embodiment, DSM server 170 calculates an estimated level of crosstalk interference 225 which was cancelled by vectoring within the vectored group 211. Such a calculation may help to assess how well vectoring is working as applied to the vectored group 211 of digital communication lines 210.

In one embodiment, the SNR(f) 217 and Quiet Line Noise Power Spectral Density, QLN(f) 219, for each of the plurality of digital communication lines 210 in the vectored group 211 are used by the DSM server 170 to calculate a value for the mitigated noise level, a value for the non-mitigated noise level 216, and a value for the baseline level of interference 224 on the respective digital communication line within the vectored group 211 when the interference (e.g., noise 223) attributable to the other digital communication lines 210 within the same vectored group 211 is perfectly canceled.

Figure 2C:
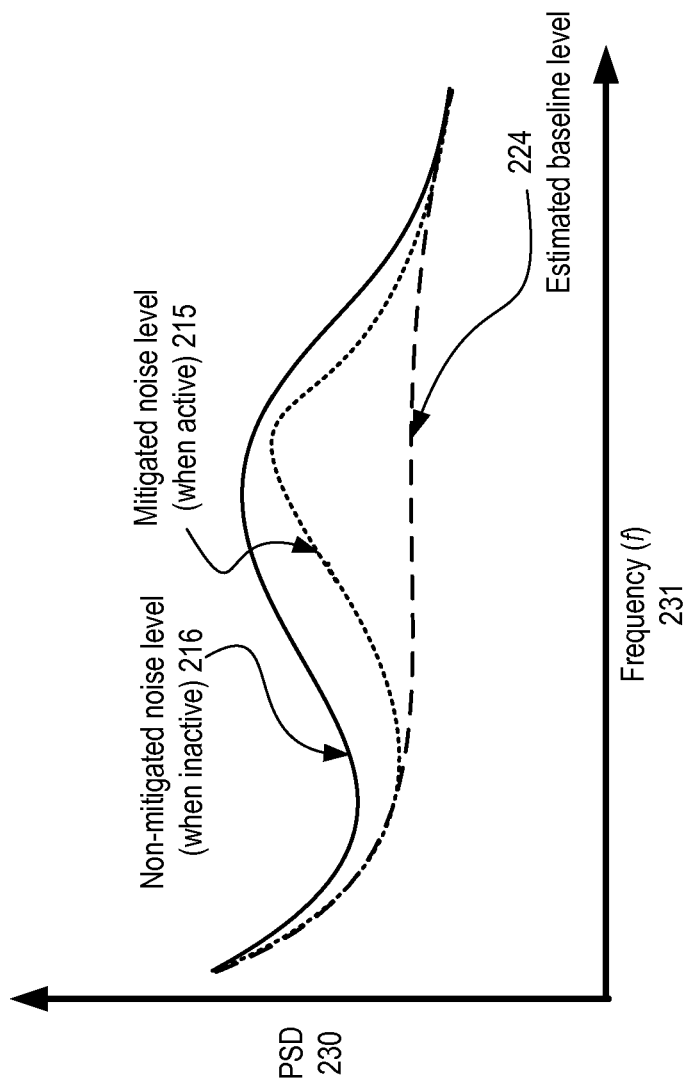

FIG. 2C illustrates an alternative exemplary architecture 202 in which embodiments may operate. PSD 230 is depicted on the vertical axis and Frequency (f) 231 is depicted on the horizontal axis of the graph.

In one embodiment, the mitigated noise level 215 represents a first amount of noise measured on the respective digital communication line within the vectored group 211 while noise cancellation techniques are active to cancel out crosstalk attributable to other digital communication lines 210 within the same vectored group 211. In one embodiment, the non-mitigated noise level 216 represents a second amount of noise measured on the respective digital communication line within the vectored group 211 while noise cancellation techniques are inactive. In one embodiment, the non-mitigated noise level 216 includes uncancelled interference from the other digital communication lines 210 within the same vectored group 211. The difference between non-mitigated noise level 216 and mitigated noise level 215 for a given line yields $CXT_i(f)$ which is the crosstalk that was removed by vectoring cancellation when noise mitigation is active.

In one embodiment, the DSM server 170 measures a signal-to-noise ratio, SNR(f) 217, for each of the plurality of digital communication lines 210 in the vectored group 211. In one embodiment, the estimated baseline level of interference 224 includes at least one of: an estimated level of interference attributable to receiver electronics, the receiver electronics being part of a receiver coupled with one of the plurality of digital communication lines 210. For example, such a receiver may operate at or within a user's terminal equipment 102 as set forth at FIG. 1, within one of the Transceiver Units 142 and 122 shown at FIG. 1, or within other communication equipment connected with the digital communication lines 210. In one embodiment, the estimated baseline level of interference 224 includes an estimated level of interference attributable to an imperfect implementation of the crosstalk cancellation for the vectored group 211.

With reference again to FIG. 2B, in accordance with one embodiment, the DSM server 170 analyzes the vectored group 211 by: estimating theoretical Far end crosstalk (FEXT); comparing the estimated theoretical FEXT to the mitigated noise levels 215 measured for the plurality of digital communication lines 210 in the vectored group 211; determining effectiveness of the crosstalk cancellation for the vectored group 211; and issuing commands to a Vectoring Control Entity (VCE) communicably interfaced with the vectored group 211. For example, by issuing commands in the form of optimization instructions 218.

In one embodiment, the DSM server 170 calculates an estimated performance gain based on the analysis of the vectored group 211 and compares the estimated performance gain against a threshold. The DSM server 170 may elect or decline to send optimization instructions 218 based on whether or not an estimated performance gain exceeds a minimum threshold. For example, where the gain is determined to be minimal, insufficient, or inconsequential, the DSM server may elect to apply vectoring resources elsewhere, or to apply a different set or type of optimization instructions in place of applying vectoring to a line.

FIG. 2D illustrates an alternative exemplary architecture 203 in which embodiments may operate. PSD 230 is again depicted on the vertical axis and Frequency (f) 231 is depicted on the horizontal axis of the graph.

In one embodiment, the DSM server 170 identifies transmit Power Spectral Density (PSD) and a type of an alien crosstalker based on a crosstalk coupling frequency or a crosstalk coupling frequency range 232 affecting one or more of the plurality of digital communication lines 210 in the vectored group 211 based on the analysis of the vectored group 211. As depicted, a spike in PSD 230 is shown with regard to a particular crosstalk coupling frequency range 232 indicating a probable alien crosstalker.

With reference again to FIG. 2B, in accordance with one embodiment, the DSM server 170 performs noise-typing of an interference signal based on the analysis of the vectored group 211 and identifies a source of the interference signal based on the noise-typing. For example, noise-typing may determine the type of noise which may be attributable to interferences such as RFI (Radio Frequency Interference), crosstalk; impulse noise, noise in a certain frequency band or at certain power levels, and so forth. Based on the power level or measured PSD for the particular frequency range, the crosstalk coupling frequency range 232 may be typed against, or correlated with a known determinable source.

Impairment on vectored DSL lines, such as those in the vectored group 211 may be determinable based on a determined crosstalk coupling (Xlog). Xlog may carry signatures of unwanted impairments such as watered-cable, bad-splice, wires with insufficient shielding, wires with insufficient twisting, etc. Using field measurements for a network, it is possible to investigate the data and look for unique signatures.

In one embodiment, the DSM server 170 correlates the alien crosstalker with one of the plurality of lines in the second subset of digital communication lines 210 which operate external 212 to the vectored group 211 or with one of the plurality of digital communication lines 210 in the vectored group 211 based on the crosstalk coupling frequency or the crosstalk coupling frequency range 232 associated with the alien crosstalker.

Profile optimization (PO) can be performed for multi-line vectored systems. Joint profile optimization of multiple DSL lines in a vectored group 211 instead of performing profile optimization independently line-by-line is possible in cases where the vectored lines are not independent. Such dependent cases include poor cancellation due to time-varying coupling from factors such as temperature variation or aerial cable movement. Profile optimization may include, for example, sending optimization instructions 218 from the DSM server to control transmit power and spectra to reduce the effects of crosstalk from those poorly cancelled lines on the remaining pairs in a binder.

In one embodiment, the optimization instructions 218 include noise cancellation directed toward the identified alien crosstalker. In one embodiment, the DSM server 170 calculates an estimated performance gain attributable to issuing the optimization instructions 218.

In one embodiment, the DSM server 170 identifies an alien crosstalker based on the analysis of the vectored group 211. In one embodiment, the alien crosstalker corresponds to one of: a non-vectored digital communication line among the plurality of digital communication lines 210; a non-vectored digital communication line within a common binder with the plurality of digital communication lines 210 in the vectored group 211; or a non-vector-friendly digital communication line among the plurality of digital communication lines 210 within the vectored group 211.

In one embodiment, the non-vector-friendly digital communication line is communicably interfaced with a non-vector-friendly Digital Subscriber Line Modem (DSL modem) which does not support vectoring or does not implement vectoring. For example, one of the users' terminal equipment 102 devices as shown at FIG. 1 may be a legacy device or a non-compatible modem which cannot or does not implement vectoring.

In one embodiment, the DSM server 170 correlates the alien crosstalker with one of the plurality of lines in the second subset of digital communication lines 210 which operate external 212 to the vectored group 211 or with one of the plurality of digital communication lines 210 in the vectored group 211 based on neighborhood information using DSM level 2 joint spectral optimization among a selection of vectored lines, vector-friendly lines, and/or non-vector-friendly lines within the first and second subsets of digital communication lines 210 which operate within and external 212 to the vectored group 211 respectively.

In one embodiment, a first alien crosstalker inside of the vectored group 211 yields an estimated performance gain which is less than an estimated performance gain for a second alien crosstalker external 212 to the vectored group 211. In such an embodiment, the first alien crosstalker corresponds to one of the first subset 211 of digital communication lines 210 allocated to the vectored group 211 and the second alien crosstalker corresponds to one of the second subset of digital communication lines 210 to operate external 212 to the vectored group 211. Stated differently, the line which is already a member of the vectored group may benefit less, in terms of an estimated performance gain attributable to the proposed optimization instructions 218 in comparison to a line which is not already a member of the vectored group.

In one embodiment, the DSM server 170 identifies an alien crosstalker among the plurality of digital communication lines 210 based on the analysis of the vectored group 211 and the DSM server 170 issues the optimization instructions 218 for the vectored group 211 based on the alien crosstalker being identified as one of the plurality of digital communication lines 210 external 212 to the vectored group 211.

In one embodiment, the DSM server 170 identifies one or more digital communication lines 210 external 212 to the vectored group 211 based on the analysis of the vectored group 211 and performs at least one of the following operations for the identified one or more digital communication lines 210 external 212 to the vectored group 211: a) the DSM server 170 changes system parameters affecting at least one of the digital communication lines 210 external 212 to the vectored group 211, and b) the DSM server 170 migrates at least one of the digital communication lines 210 which operates external 212 to the vectored group 211 to operate within the vectored group 211. For example, such actions may be taken to institute remediation efforts based on the crosstalkers being identified as having a high-potential for improvement to the overall operation of the vectored group 211. For example, where an estimated performance gain exceeds a threshold, the DSM server 170 may determine that taking an affirmative remedial action will be worthwhile in terms of performance gain and system optimization.

Figure 3A:
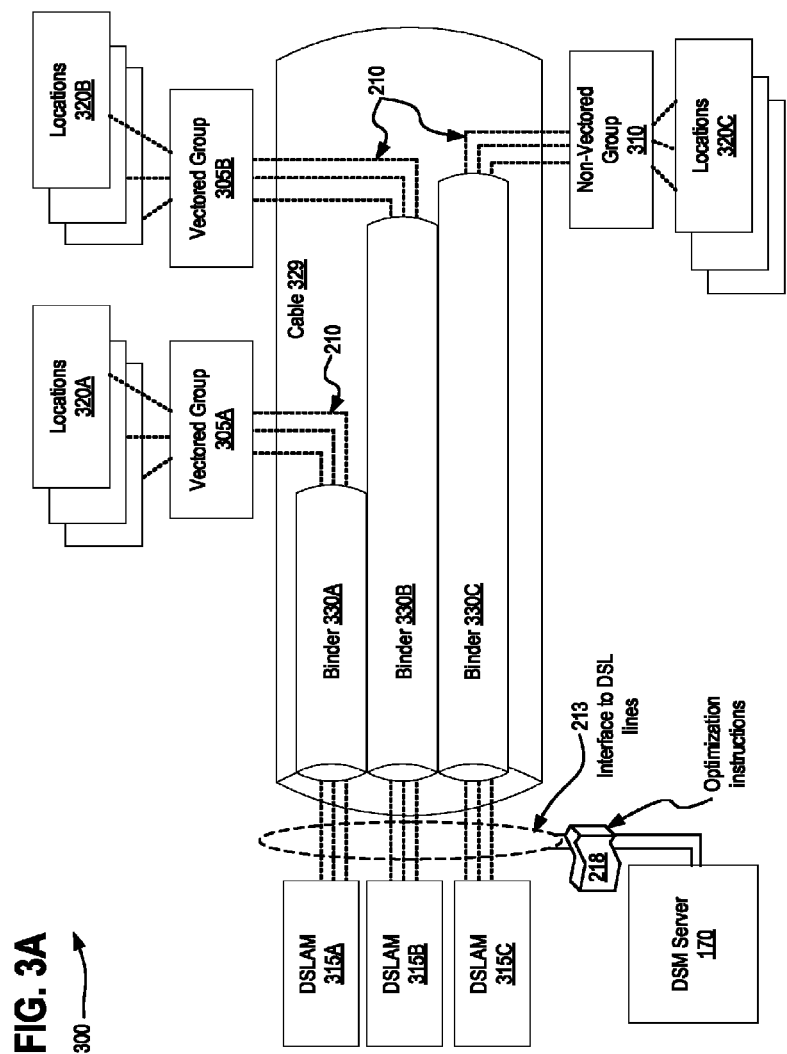
FIGS. 3A, 3B, 3C, and 3D illustrate alternative exemplary architectures in which embodiments may operate.

FIG. 3A illustrates an alternative exemplary architecture 300 in which embodiments may operate. In particular, a cable 329 is shown having binders 330A, 330B, and 330C therein. Binder 330A has digital communication lines connecting vectored group 305A with locations 320A via DSLAM 315A. Binder 330B has digital communication lines connecting vectored group 305B with locations 320B via DSLAM 315B. Binder 330C has digital communication lines connecting a non-vectored group 310 of lines with locations 320C via DSLAM 315C.

As noted above, the DSM server 170 may perform DSM level 2 joint spectral optimization among a selection of vectored lines using neighborhood information. Such information is available with regard to the various sets of locations 320A-C, each representing, for example, a neighborhood or a geographical area common to each particular set of locations, such as 320A or 320B or 320C. In one embodiment the neighborhood information specifies at least cable and/or binder information associated with a given set of locations 320A-C.

A state machine for profile vectors may be utilized which includes a profile for each vectored line. The state machine may be utilized to improve stability and speeds of the entire vectored group, such as vectored group 305A and/or 305B. Such analysis and use of a state machine for the profile vectors may be referred to as Neighborhood Profile Optimization or NPO. A permanent record of vectoring performance data and Xlog data may be captured and stored for future planning purposes. Such a record may include information reflecting a determination and performance tracking when a line leaves or joins a vector group 305A-B. Neighborhood Profile Optimization may be utilized to anticipate the impact of alien noise when vectoring is applied before vectoring is actually applied on a line or group of lines, and Neighborhood Profile Optimization may be used to compare performance when a dominant crosstalker is on versus when it is off.

The arrangement of vectored groups 305A and 305B each allocated to a respective common binder 330A and 330B respectively and the non-vectored group 310 not sharing a binder with the vectored groups 305A-C represents an optimal allocation scheme. However, it may not always be possible to achieve such an allocation scheme. In other instances, re-arranging, re-routing, and re-allocating may improve the allocation scheme.

Managing vectored lines, such as those within vectored groups 305A and 305B, managing vector friendly lines, and managing legacy lines, may include identification of a non-vectored-friendly CPE connected to a vectored DSLAM (Digital Subscriber Line Access Multiplexer) or an alien disturber or alien crosstalker which is connected to a non-vectored DSLAM (including an ADSL2/2+ line) limiting the performance of the vectored system. Non-vector friendly lines can disturb vectored lines synch, and other operating characteristics. Profile optimization for the non-vectored-friendly CPE, or if possible the alien disturber/crosstalker may minimize detrimental effects on the vectored group, and may therefore yield an operational benefit, for example, initiated by issuing optimization instructions 218. Such optimization instructions may include, for example, DSM level II methods, power management and rate control.

Vectoring diagnostics, and Xlog data may be used in conjunction with DSM level 2, joint DSM 2 spectral optimization, and DSM 3 vectoring, to achieve customer target bitrates on vectored and non-vectored lines, for example, by optimizing vectored to non-vectored interference in situations where lines are mutually interfering so as to prevent excessive retraining or packet errors.

Information pertaining to neighborhood location and vector groups 305A-B may be used to enable optimal selection of vector groups 305A-B and to assign cancellation resources within a vector group. For example, assigning vector cancellation to lines that are indicated to be close to each other based on neighborhood information, such as a known, estimated, or determined physical proximity of locations 320A-C within a particular geographical location. This may be done based on DSLAM information or information from a serving terminal that can be considered as a part of overall neighborhood/cable information.

Vectored lines are synchronized allowing for accurate calculation of noise correlations. Neighborhood information can be combined with this correlation information to estimate the location of the root source of noise, for example noise originating near some home(s) effecting lines in the same neighborhood.

Certain neighborhoods may benefit more than others from vectoring, and neighborhood information may be utilized to recommend upgrades from non-vectored to vectored systems during a roll-out prioritization phase, or in situations where not all components will be upgraded to vectoring compatible devices.

Xlog data and vectoring performance analysis may be used to determine which lines and frequency bands should be vectored. This data may also be used to determine to which subscribers phantom circuits, and/or bonding should be deployed on to improve speeds or reaches.

Vectoring diagnostics may provide vital information to ensure fairness among several providers in specific regulatory environments. For example, in cases where bit-stream unbundling for VDSL is carried out with one provider per line, the availability of Xlog data and vectoring performance data may become essential for management of the cable interests between different operators. In the bit-stream unbundling case, an entire infrastructure is managed by a single operator, and then monitoring for fairness becomes important as well as managing for fairness.

Vector resource allocation may be used to assist bandwidth allocation. For example, if the network serves an apartment complex and the complex purchases the service, the bandwidth may be divided and reapportioned among subscribers to some extent by assigning vectoring resources.

Phantom mode may be used in multi-line systems as well as the diagnostics unique to phantom mode. A measurement system that measures common mode voltages, powers, PSDs, FDR (Frequency-Domain Reflectometer) traces and TDR (Time-Domain Reflectometer) traces, etc. may be used to diagnose each individual wire used in phantom mode transmission, measurement system in contrast to conventional systems which measure quantities differentially across a wire pair. Similarly, a unique type of single-ended line test (SELT) may be applied to phantom mode on a single wire to ground instead of across a wire pair.

A "Cu-PON" ("Copper Passive Optical Network") is a multidropping DSL architecture that enables DSL bandwidth sharing and increases data rates through exploitation of all modes of crosstalk, particularly with the use of vectored dynamic spectrum management. The Cu-PON shares bandwidth across multiple copper pairs in a cable, enables variable numbers of multiple drop lines to each subscriber, and may use phantom mode and vectoring. The Cu-PON enables highly adaptable bandwidth allocation. The Cu-PON may be used to effectively feed multiple CPEs within the same location, such as a business or residence.

It is useful to know Xlog or Xlin for many purposes related to planning, resource allocation, profile optimization, and diagnostics. An estimator exploits the fact that $E[x_p x_j] \sim = 0$ for $p \mathrel{!}= j$. The resulting estimate is further improved by removing the bias inherent in the non-zero cross correlation of finite data sequences. When crosstalk is not being handled properly, DSL data including Xlog may be used for diagnosing the situation and reassignment of vector-group, binder or both, as necessary, to resolve the issue.

Thus, in accordance with some embodiments, the optimization instructions 218 include re-allocating or reassigning lines into and out of a vectored group.

Figure 3B:
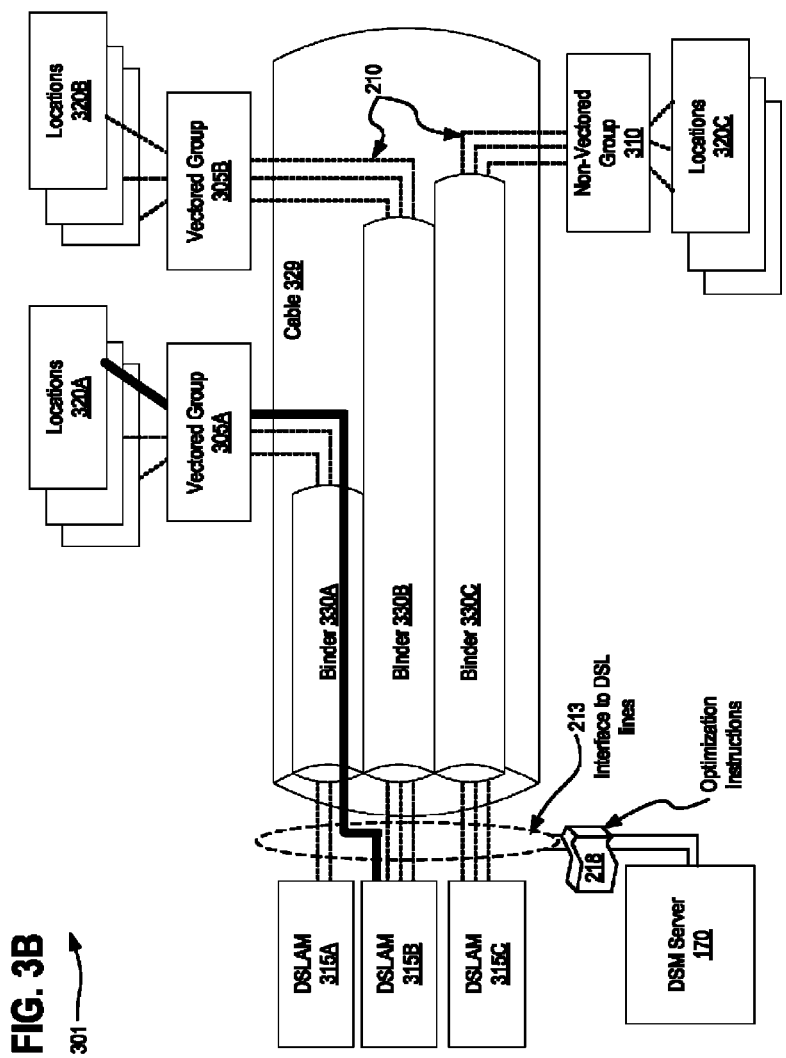

FIG. 3B illustrates an alternative exemplary architecture 301 in which embodiments may operate. In the example shown here, optimization instructions may yield an improvement by re-allocating all lines associated with locations 320A to operate with vectored group 305A so that all such lines traverse the same binder at 330A and participate in the same vectoring scheme at 305A. In this example, the bold line from locations 320A may have been associated with another vectored group other than 305A or may not have been assigned to a vectored group.

Figure 3C:
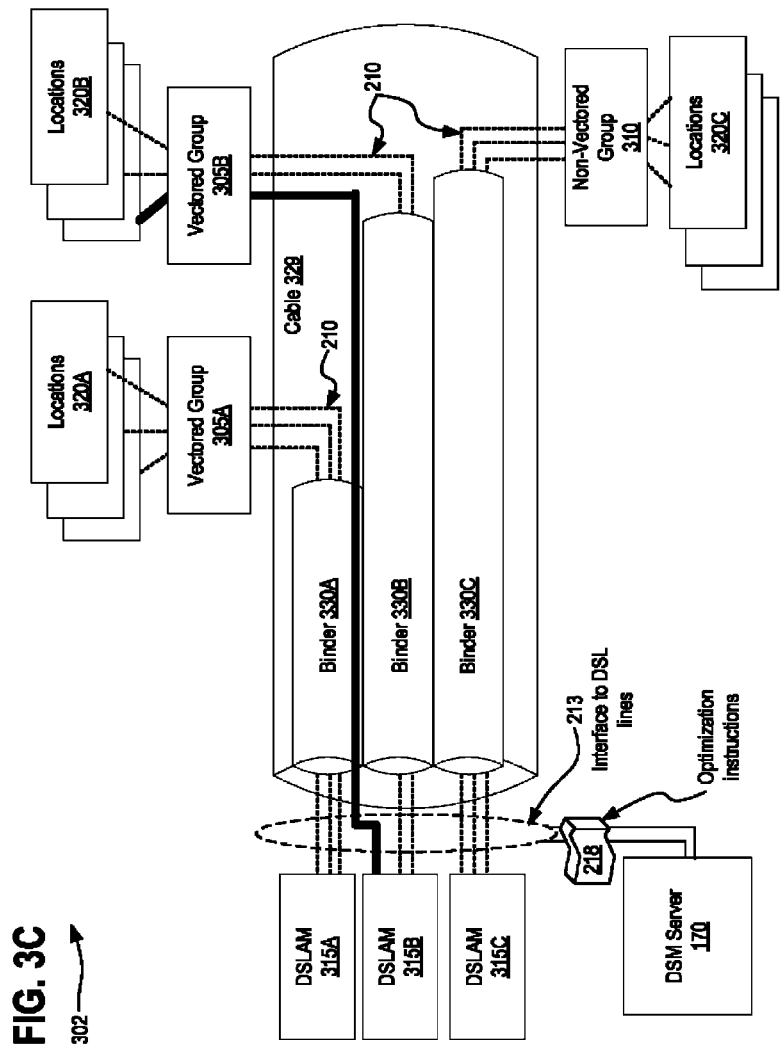

FIG. 3C illustrates an alternative exemplary architecture 302 in which embodiments may operate. In the example shown here, optimization instructions may yield an improvement by changing the routing of a line from locations 320B such that it traverses binder 330B and participates in the same vectored group 305B. Through neighborhood analysis, the locations 320B may determined to share a common geographical location, such as a neighborhood, and thus, it may be beneficial to re-route communications for a particular location from, for example, a line 210 in binder 330B and onto a line 210 in binder 330A.

In other embodiments, optimization instructions may yield an improvement by changing both the grouping and the routing of a line 210 servicing a particular location 330A. For example, a location may be added to vectored group 305B and the line 210 servicing that location may be re-routed such that it shares a common binder with the other members of vectored group 305B, such as binder 330B.

Figure 3D:
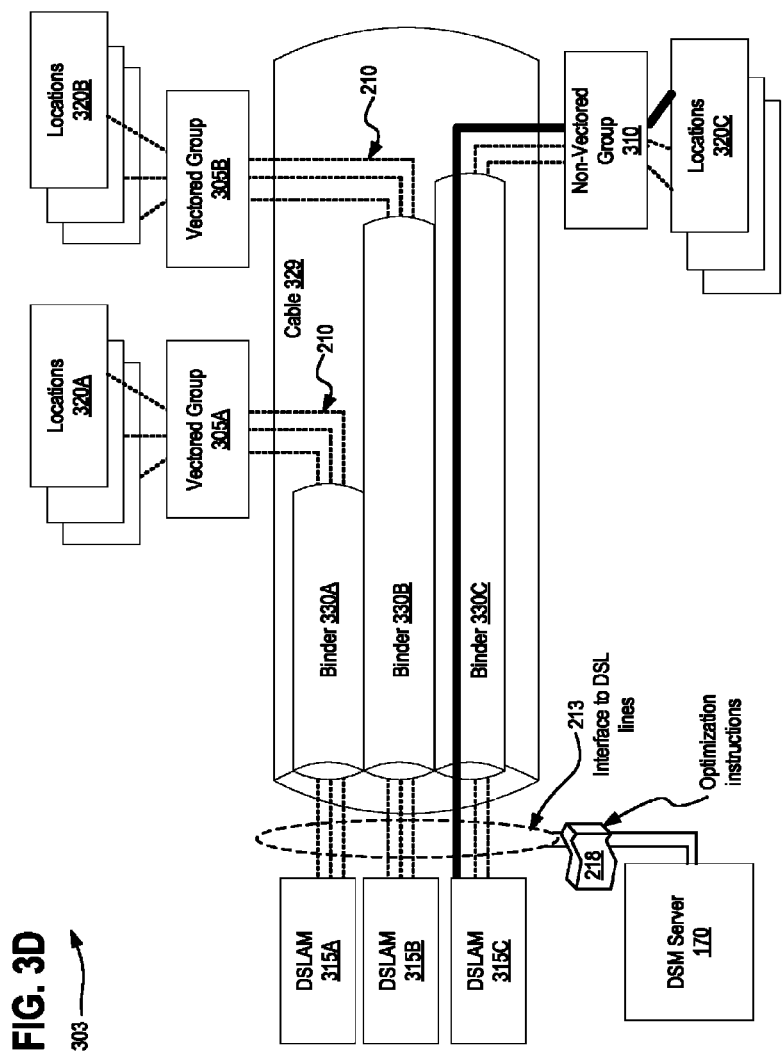

FIG. 3D illustrates an alternative exemplary architecture 303 in which embodiments may operate. In the example shown here, optimization instructions may yield an improvement by changing the routing for the line due to the line's proximity with another line being analyzed. For example, choosing another line within binder 330C may be beneficial where border lines within binder 330C exhibit a strong coupling with border lines of binder 330B, thus, selecting a different line within the same binder 330C which is more distant from the border lines of 330B may yield a benefit. Such grouping into lines, binders, and cables is common with twisted pair lines or loops used as digital communication lines 210.

In accordance with one embodiment, issuing the optimization instructions 218 for the vectored group 211 includes: changing one or more parameters affecting operation of the vectored group 211, in which the one or more parameters are selected from the group including: bit rate, margin, Power Spectral Density (PSD) limits, vectoring resource allocations, and Impulse Noise Protection (INP) settings.

In one embodiment, changing the one or more parameters affecting operation of the vectored group 305A-B includes issuing the optimization instructions 218 to change the one or more parameters in at least one of: a Digital Subscriber Line Access Multiplexer (DSLAM) 315A-C communicably interfaced with at least one of the plurality of digital communication lines in the vectored group 305A-B, one or more DSLAMs (e.g., one of 315B or 315C) adjacent to the first DSLAM (e.g., 315A), for example, the DSLAM adjacent to the first DSLAM may enable control of the transmit power or PSD of non-vectored lines which are identified as creating crosstalk interference into the vectored group 305A-B.

Changing the one or more parameters may further include changing one or more parameters in at least one of: a Customer Premises Equipment (CPE) modem communicably interfaced with at least one of the plurality of digital communication lines in the vectored group 305A-B or within a DSL Element Management System (EMS) communicably interfaced with at least one of the plurality of digital communication lines in the vectored group 305A-B.

In one embodiment, issuing the optimization instructions 218 for the vectored group 305A-B includes: a) dispatching orders to modify a configuration of one or more system elements communicably interfaced with at least one of the plurality of communicably interfaced digital communication lines; b) generating service recommendations including service upgrades, service downgrades, or different service options, based on the analysis of the vectored group 305A-B; c) initiating a customer notification based on the analysis of the vectored group 305A-B, the customer notification being directed to a customer of services associated with one of the plurality of communicably interfaced digital communication lines; and d) initiating a service provider notification based on the analysis of the vectored group 305A-B, the service provider notification being directed to a service provider of services associated at least one of the plurality of communicably interfaced digital communication lines. In one embodiment, issuing the optimization instructions 218 includes initiating noise cancellation directed toward an identified alien crosstalker.

In one embodiment, issuing the optimization instructions 218 for the vectored group 211 includes performing at least one of the following operations: a) changing system parameters affecting at least one of the digital communication lines operating external (e.g., in the non-vectored group 310) to the vectored group 305A-B, and b) migrating at least one of the digital communication lines operating external to the vectored group to operating within the vectored group.

In accordance with one embodiment, a non-transitory computer readable storage medium stores instructions that, when executed by a processor in a Dynamic Spectrum Management server (DSM server 170), the instructions cause the DSM server 170 to perform operations including: communicably interfacing with a plurality of digital communication lines 210; identifying, within the plurality of digital communication lines 210, a vectored group 305A-B having a plurality of digital communication lines 210 allocated thereto; analyzing the vectored group 305A-B by performing the following sub-operations for each of the plurality of digital communication lines 210 in the vectored group 305A-B: (a) measuring a mitigated noise level for the digital communication line with crosstalk cancellation mitigation active, (b) measuring a non-mitigated noise level for the digital communication line with crosstalk cancellation mitigation inactive, and (c) comparing the mitigated noise level measured on the digital communication line with the non-mitigated noise level measured on the digital communication line; and issuing optimization instructions 218 for the vectored group 305A-B based on the analysis of the vectored group 305A-B.

Figure 4:
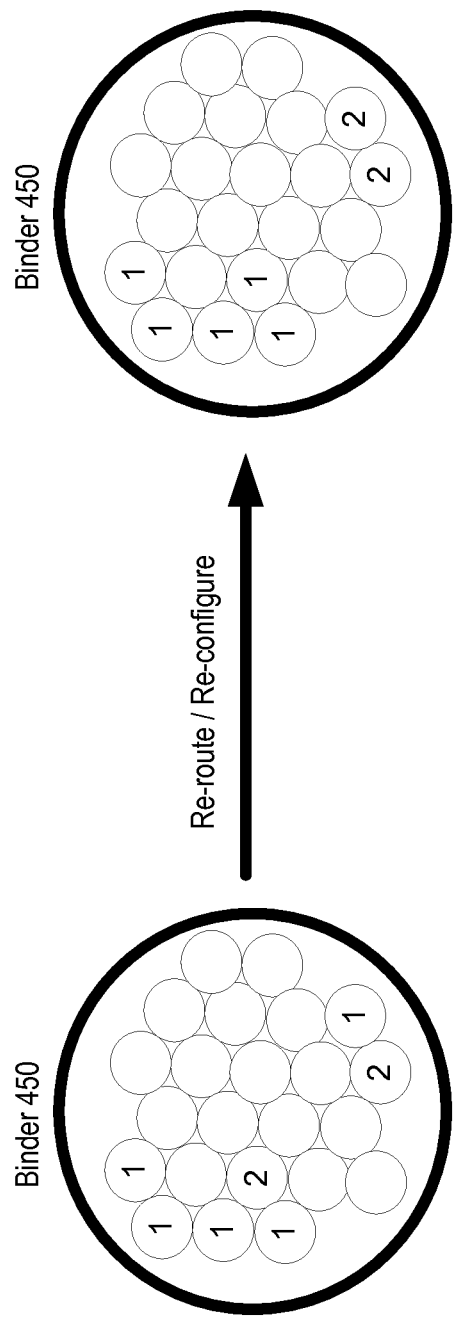
FIG. 4 illustrates exemplary binder re-configuration in accordance with which embodiments may operate.

FIG. 4 illustrates exemplary binder re-configuration 400 in accordance with which embodiments may operate. When vectored and non-vectored lines are mixed in the same binder and they cannot be separates into two independent binders, copper assignment within a binder might have an operational benefit. Typically, operators have pair or line number and the corresponding geometric location information.

As can be seen, lines within binder 450 are re-routed or re-configured to maximize distance between the various pairs or lines. This type of routing might be possible if the equipment vendor offers larger node sizes for vectoring or some means of electronic cross connection of the various lines.

Within the binder 450, vectored lines may be placed together, as represented by the pairs associated with the number "1," and non-vectored lines associated with the number "2" are placed together, distant from the vectored lines. The same technique may additionally be applied across to multiple binders within a cable, for the border pairs which are in distinct binders but nevertheless in close proximity. In an alternative embodiment, virtual binder groups may be created by grouping lines together with high crosstalk, but which are not necessarily in the same physical cable binder, with similar operations performed on the virtual binder.

FIG. 5 illustrates a diagrammatic representations of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes a communication bus 515 to interface, transfer, transact, relay, and and/or communicate information, transactions, instructions, requests, and data within system 500, and among plurality of peripheral devices. System 500 further includes management interface 525, for example, to receive requests, return responses, and otherwise interface with network elements located separately from system 500.

In some embodiments, management interface 525 communicates information via an out-of-band connection separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the system 500 and other networked devices or between the system 500 and a third party service provider.

System 500 further includes DSL line interface 530 to communicate information via a LAN based connection, to monitor connected DSL lines, DSL loops, DSL twisted pairs, and Digital communication lines which are interfaced to system 500. System 500 further includes stored historical information 550 that may be analyzed or referenced when conducting long term trending analysis and reporting. System 500 may further include multiple optimization instructions 555, any of which may be initiated responsive to analysis of the vectored and non-vectored lines. For example, corrective actions, additional diagnostics, information probes, configuration change requests, local commands, remote execution commands, and the like may be specified by and triggered as optimization instructions 555. The stored historical information 550 and the optimization instructions 555 may be stored upon a hard drive, persistent data store, a database, or other storage location within system 500.

Distinct within system 500 is DSM server 501 which includes collection module 570, analysis module 575, diagnostics module 580, and implementation module 585. DSM server 501 may be installed and configured in a compatible system 500 as is depicted by FIG. 5, or provided separately so as to operate in conjunction with appropriate implementing logic 560 or other software.

In accordance with one embodiment, collection module 570 collects information from available sources, such as from interfaced digital communication lines over the DSL line interface 530 of system 500 or from other network elements via management interface 525. Analysis module 575 analyzes the information retrieved via collection module 570. Analysis module 575 may further perform long term trending analysis based on stored historical information 550 or conduct neighborhood analysis based on aggregation data yielded from multiple separate and distinct digital communication lines. Diagnostics module 580 may conduct specialized diagnostic routines and algorithms in conjunction with or separately from analysis module 575. Diagnostics module 580 may conduct additional probing diagnostics to retrieve or trigger the output of additional diagnostics information for further analysis. Implementation module 585 implements and initiates various optimization instructions 555 including generating and instantiating instructions CPE modems, DSLAMs, and vectoring engines and hardware, and other network elements.

FIG. 6 is a flow diagram 600 illustrating a method for diagnosing and optimizing vectored DSL lines in accordance with described embodiments. Method 600 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating optimization instructions, calculations, or some combination thereof). In one embodiment, method 600 is performed or coordinated via DSM server such as that depicted at element 170 of FIG. 1 and at element 501 of FIG. 5A. Some of the blocks and/or operations listed below are optional in accordance with certain embodiments. The numbering of the blocks presented is for the sake of clarity and is not intended to prescribe an order of operations in which the various blocks must occur. Additionally, operations from flow 600 may be utilized in a variety of combinations.

Method 600 begins with processing logic for communicably interfacing with a plurality of digital communication lines at block 605.

At block 610, processing logic identifies a vectored group having a plurality of digital communication lines allocated thereto.

At block 615, processing logic analyzes the vectored group including measuring and comparing a mitigated noise level and a non-mitigated noise level. For example, processing logic measures a mitigated noise level for each digital communication line with crosstalk cancellation active and processing logic measures a non-mitigated noise level for each digital communication line with crosstalk cancellation inactive. The analysis further includes comparing the mitigated noise level measured with the non mitigated noise level and conducting other necessary calculations.

At block 620, processing logic issues optimization instructions for the vectored group based on the analysis of the vectored group (e.g., changing parameters, dispatching orders, generating service recommendations, initiating a customer/service provider notification, or migrating a line). For example, processing logic may change one or more parameters affecting operation of the vectored group. Such processing logic may dispatch orders to modify a configuration of one or more system elements communicably interfaced with at least one of the plurality of communicably interfaced digital communication lines. Processing logic may generate service recommendations including service upgrades, service downgrades, or different service options, based on the analysis of the vectored group. Processing logic may initiate a customer notification based on the analysis of the vectored group. Processing logic may initiate a service provider notification based on the analysis of the vectored group. Processing logic may migrate at least one of the digital communication lines operating external to the vectored group to operating within the vectored group. For example, reallocate, reassign or reconfigure a non-vectored line into a vectored group, or from one vectored group to another vectored group.

At block 625, processing logic performs noise-typing for an interference signal based on the analysis of the vectored group and identifying a source of the interference signal based on the noise-typing (e.g., identify PSD and type of an alien crosstalker, correlating an alien crosstalker with a line, and calculating an estimated performance gain). For example, processing logic may identify transmit Power Spectral Density (PSD) and a type of an alien crosstalker based on a crosstalk coupling frequency or a crosstalk coupling frequency range affecting one or more of the plurality of digital communication lines in the vectored group based on the analysis of the vectored group. Such processing logic may correlate the alien crosstalker with one of the plurality of lines which operate external to the vectored group or with one of the plurality of digital communication lines in the vectored group based on the crosstalk coupling frequency or the crosstalk coupling frequency range associated with the alien crosstalker. Processing logic may calculate an estimated performance gain attributable to issuing the optimization instructions and compare it to a threshold or use the calculation to determine whether to initiate optimization instructions and what optimization instructions to initiate.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent data base implementations), which communicate with each other via a bus 730. Main memory 704 includes information and instructions and software program components necessary for performing and executing the functions with respect to the various embodiments of the systems, methods, and DSM server as described herein. Optimization instructions 723 may be triggered based on, for example, analysis of neighborhood information, SNR data, PSD data, noise levels with mitigation active and noise levels with mitigation inactive, and so forth. Collected data and calculations 724 are stored within main memory 704. Optimization instructions 723 may be stored within main memory 704 and as collected and determined by DSM server 734. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of a DSM server 734 capable interfacing with digital communication lines in vectored and non-vectored groups, monitoring, collecting, analyzing, and reporting information, and initiating, triggering, and executing various optimization instructions 723 including the execution of commands and instructions to alter characteristics and operation of vectoring mechanisms.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
   an interface to a plurality of digital communication lines allocated to a vectored group; and
   a management system to analyse the vectored group and perform diagnostic analysis, wherein the management system is to perform the following operations for at least one of the digital communication lines of the plurality of digital communication lines in the vectored group:
   measure a mitigated noise level for the at least one digital communication line during a time of active transmission and with crosstalk cancellation mechanism active,
   measure a background noise level for the at least one digital communication line during a time of no active transmission and with no crosstalk,
   estimate a level of total crosstalk into the at least one digital communication line, and compare the mitigated noise level measured on the at least one digital communication line with a total crosstalk level measured on the digital communication line.

2. The system of claim 1, wherein the management system is to issue optimization instructions based on the diagnostic analysis.

3. The system of claim 2, wherein the management system is to issue the optimization instructions for the vectored group.

4. The system of claim 2, wherein the management system is to issue the optimization instructions for one or more of the digital communication lines which operate external to the vectored group.

5. The system of claim 2, wherein the management system is to issue the optimization instructions for both the vectored group and for one or more of the digital communication lines which operate external to the vectored group.

6. The system of claim 2, wherein the plurality of digital communication lines comprises a plurality of Digital Subscriber Lines (DSL lines), and wherein the first subset of the plurality of digital communication lines allocated to the vectored group comprises a plurality of vectored DSL lines.

7. The system of claim 2, wherein the management system is to analyze the vectored group by calculating an estimated noise level and an estimated crosstalk level for each of the plurality of digital communication lines in the vectored group.

8. The system of claim 2, wherein the management system is to calculate the estimated noise level and the estimated crosstalk level based at least in part on a measured signal to noise ratio, SNR(f), for each of the plurality of digital communication lines in the vectored group.

9. The system of claim 2, wherein the management system is to calculate the estimated noise level for each of the plurality of digital communication lines in the vectored group by calculating a total Far End Crosstalk (FEXT) Power Spectral Density (PSD) received by each of the plurality of digital communication lines in the vectored group.

10. The system of claim 2, wherein the mitigated noise level represents a first amount of noise measured on a respective digital communication line within the vectored group while noise cancellation techniques are active to cancel out crosstalk attributable to other digital communication lines within the same vectored group.

11. The system of claim 10, wherein the non-mitigated noise level represents a second amount of noise measured on the respective digital communication line within the vectored group while noise cancellation techniques are inactive, wherein the second amount of noise measured includes uncancelled interference from the other digital communication lines within the same vectored group.

12. The system of claim 11, wherein a baseline level of interference is estimated by subtracting a total crosstalk level XT(f) based on Xlog from the non-mitigated noise level.

13. The system of claim 12, wherein the management system is to measure a Signal-to-Noise Ratio, SNR(f), for each of the plurality of digital communication lines in the vectored group, wherein the SNR(f) and Quiet Line Noise Power Spectral Density, QLN(f), for each of the plurality of digital communication lines in the vectored group are used by the management system to calculate:
the mitigated noise level;
the non-mitigated noise level; and
the baseline level of interference on a respective digital communication line within the vectored group when the interference attributable to the other digital communication lines within the same vectored group is perfectly canceled.

14. The system of claim 12, wherein the estimated baseline level of interference comprises at least one of:
an estimated level of interference attributable to receiver electronics, the receiver electronics being part of a receiver coupled with one of the plurality of digital communication lines;
an estimated level of interference attributable to an imperfect implementation of the crosstalk cancellation for the vectored group; and
an estimated level of crosstalk interference which was cancelled by vectoring within the vectored group.

15. The system of claim 2, wherein the management system is to identify transmit Power Spectral Density (PSD) and a type of an alien crosstalker based on a crosstalk coupling frequency or a crosstalk coupling frequency range affecting one or more of the plurality of digital communication lines in the vectored group based on the analysis of the vectored group.

16. The system of claim 2, wherein the management system is to analyze the vectored group further comprises the management system to:
estimate theoretical Far end crosstalk (FEXT);
compare the estimated theoretical FEXT to the mitigated noise levels measured for the plurality of digital communication lines in the vectored group;
determine effectiveness of the crosstalk cancellation for the vectored group; and
issue commands to a Vectoring Control Entity (VCE) communicably interfaced with the vectored group.

17. A method comprising:
communicably interfacing with a plurality of digital communication lines;
identifying, within the plurality of digital communication lines, a vectored group having a plurality of digital communication lines allocated thereto; and
analyzing the vectored group by performing the following operations for at least one of the digital communication lines of the plurality of digital communication lines in the vectored group:
measuring a mitigated noise level for the digital communication line line during a time of active transmission and with crosstalk cancellation active,
measuring a background noise level for the digital communication during a time of no active transmission and with no crosstalk,
estimating the level of total crosstalk into the digital communication line,
comparing the mitigated noise level measured on the digital communication line with the total crosstalk noise level measured on the digital communication line; and
performing diagnostic analysis.

18. The method of claim 17 further comprises issuing optimization instructions based on the diagnostic analysis.

19. The method of claim 18, wherein issuing the optimization instructions comprises issuing the optimization instructions for the vectored group.

20. The method of claim 18, wherein issuing the optimization instructions comprises issuing the optimization instructions comprises for one or more of the digital communication lines which operate external to the vectored group.

21. The method of claim 18, wherein issuing the optimization instructions comprises issuing the optimization instructions for both the vectored group and for one or more of the digital communication lines which operate external to the vectored group.

22. A non-transitory machine-readable storage media having machine-readable instructions that when executed cause one or more machines to perform an operation comprising:

communicably interface with a plurality of digital communication lines;

identify, within the plurality of digital communication lines, a vectored group having a plurality of digital communication lines allocated thereto; and analyze the vectored group by performing the following operations for at least one of the digital communication lines of the plurality of digital communication lines in the vectored group:

measure a mitigated noise level for the digital communication line line during a time of active transmission and with crosstalk cancellation active, measure a background noise level for the digital communication during a time of no active transmission and with no crosstalk, estimate the level of total crosstalk into the digital communication line, compare the mitigated noise level measured on the digital communication line with the total crosstalk noise level measured on the digital communication line; and perform diagnostic analysis.

23. The non-transitory machine-readable storage media of claim 22 having machine-readable instructions that when executed cause the one or more machines to perform an operation which comprises issue optimization instructions based on the diagnostic analysis.

24. The non-transitory machine-readable storage media of claim 23, wherein issuing the optimization instructions comprises issuing the optimization instructions for the vectored group.

25. The non-transitory machine-readable storage media of claim 23, wherein issuing the optimization instructions comprises issuing the optimization instructions comprises for one or more of the digital communication lines which operate external to the vectored group.

* * * * *